United States Patent [19]
Van Der Zaag et al.

[11] Patent Number: 5,932,819
[45] Date of Patent: Aug. 3, 1999

[54] DEFLECTION RING OF SINTERED MGZN-FERRITE MATERIAL, CATHODE RAY TUBE COMPRISING SUCH A RING AND MOULDING MADE FROM THIS MATERIAL

[75] Inventors: Pieter J. Van Der Zaag, Eindhoven, Netherlands; Pieter J. Van Der Valk, Azuqueca de Henares, Spain; Hendrik J. De Wit, Eindhoven, Netherlands

[73] Assignee: U.S. Philips Corporation, New York, N.Y.

[21] Appl. No.: 09/034,440

[22] Filed: Mar. 4, 1998

Related U.S. Application Data

[62] Division of application No. 08/553,229, Nov. 7, 1995, Pat. No. 5,841,225.

[30] Foreign Application Priority Data

Nov. 7, 1994 [EP] European Pat. Off. .............. 94203263

[51] Int. Cl.$^6$ ........................................................ B22F 3/00
[52] U.S. Cl. ............................................................... 75/228
[58] Field of Search ........................... 75/228; 252/62.62, 252/62.64

[56] References Cited

U.S. PATENT DOCUMENTS

| | | | |
|---|---|---|---|
| 3,931,642 | 1/1976 | Kugimiya et al. ...................... | 360/122 |
| 4,372,865 | 2/1983 | Yu et al. ............................... | 252/62.62 |
| 4,472,369 | 9/1984 | Kambe et al. .......................... | 423/594 |
| 4,730,145 | 3/1988 | Van Der Meer et al. ............... | 313/440 |
| 4,863,625 | 9/1989 | Roelofsma et al. .................... | 252/62.59 |
| 5,057,738 | 10/1991 | Boerekamp ............................. | 313/440 |

FOREIGN PATENT DOCUMENTS

0624886A1  11/1994  European Pat. Off. ...... H01F 27/225

OTHER PUBLICATIONS

S.H. Patil, et al, "Effect of Sintering on the magnetization behaviour of MgxZn(1–x)Fe2O4 system" Bull. Mater. Sci., vol. 14, No. 5, Oct. 1991, pp. 1225–1230.

*Primary Examiner*—Ngoclan Mai
*Attorney, Agent, or Firm*—Ernestine C. Bartlett

[57] ABSTRACT

The invention relates to a deflection ring of sintered MgZn-ferrite material. In accordance with the invention, this deflection ring is characterized in that the majority of the grains of the sintered material have a monodomain structure. By virtue thereof, a relatively small heat dissipation occurs in the ring when it is used in a cathode ray tube. The average grain size of the sintered MgZn-ferrite material is preferably 2.8 micrometers or less. MgZn-ferrite materials whose composition corresponds to the formula $Mg_{1-z}Zn_zFe_{2-y}O_4$, wherein $0.1 < z < 0.4$ and $0.01 < y < 0.3$, have the additional advantage that they have a relatively high saturation magnetization and a relatively high electrical resistance. The invention also relates to a cathode ray tube comprising the above-mentioned deflection ring and to a mo1lding made from the above-mentioned MgZn-ferrite material.

9 Claims, 1 Drawing Sheet

5,932,819

DEFLECTION RING OF SINTERED MGZN-FERRITE MATERIAL, CATHODE RAY TUBE COMPRISING SUCH A RING AND MOULDING MADE FROM THIS MATERIAL

This is a divisional of application Ser. No. 08/553,229, filed Nov. 7, 1995, U.S. Pat. No. 5,841,225.

FIELD OF THE INVENTION

The invention relates to a deflection ring of sintered MgZn-ferrite material. The invention also relates to a cathode ray tube comprising such a deflection ring as well as to a moulding made from sintered MgZn-ferrite material.

BACKGROUND OF THE INVENTION

A deflection ring of the type mentioned in the opening paragraph is known per se. For example, in U.S. Pat. No. 5,057,738, filed by Applicants, a description is given of a number of deflection rings which are made from an MgZn-ferrite material which also comprises a certain quantity of Li and Mn. In this Patent, a description is also given of a cathode ray tube comprising a deflection unit having such a deflection ring.

The known deflection ring has disadvantages. It has been found that when this ring is used in a cathode ray tube, heat dissipation in the deflection unit occurs at room temperature, at induction levels of 20 to 25 mT and frequencies of 16 kHz or multiples thereof. This dissipation leads to an undesirable increase of the temperature of the tube and hence to a reduction of the life of the surrounding electronic components of the tube.

SUMMARY OF THE INVENTION

It is an object of the invention to obviate the above-mentioned disadvantage. The invention more particularly aims at providing a deflection ring as well as a cathode ray tube comprising a deflection unit, in which the heat-dissipation problem has been substantially reduced.

These and other objects of the invention are achieved by means of a deflection ring of the type mentioned in the opening paragraph, which is characterized in that the majority of the grains of the sintered material have a monodomain structure.

In series of experiments which have led to the present invention, Applicants have established that the magnetic structure of the grains is of great importance for the dissipation properties of the relevant deflection ring. Experiments have shown, for example, that sintered MgZn-ferrite materials having grains which comprise only one magnetic domain exhibit a surprisingly low heat dissipation. This applies in particular under the above-mentioned measuring conditions at induction levels of 20 to 25 mT and frequencies of 16 kHz, or multiples thereof, at room temperature. Under these conditions, the dissipation can be reduced by 20% or more. It is noted that the expression "the majority of the grains" is to be understood to mean herein "at least 90% of the grains". Further, it is noted that grains having a monodomain structure comprise only one magnetic domain.

A preferred embodiment of the deflection ring in accordance with the invention is characterized in that the average grain size of the material is 2.8 micrometers or less. Applicants have observed that at an average grain size of approximately 2.8 micrometers, approximately 90% of the grains have a monodomain structure. A smaller average grain size leads to a further increase of this percentage. Percentages of 98% and more are obtained if the average grain size of the MgZn-ferrite material ranges between 1.4 and 2.1 micrometers. The lowest heat dissipation is observed in deflection rings of sintered MgZn-ferrite material having this average grain size. It has been found that the manufacture of average grain sizes below 1.1 micrometers is relatively laborious and hence expensive. In addition, these small grain sizes do not lead to a further reduction of the dissipation because the favourable monodomain structure has already been reached. The size of the grains is defined in accordance with the so-called "mean linear intercept" method.

It is noted that measurements on the known deflection rings of MgZn-ferrite material showed that the average grain size of this material is approximately 5.0 micrometers. Consequently, the majority of the grains of the known, sintered material do not have a monodomain structure. This is the reason why the known deflection rings exhibit a relatively high heat dissipation as compared to the deflection rings in accordance with the invention.

Another favourable embodiment of the deflection ring in accordance with the invention is characterized in that the composition of the sintered material corresponds to the formula $Mg_{1-z}Zn_zFe_{2-y}O_4$, wherein $0.1<z<0.4$, $0.01<y<0.3$. Deflection rings having this composition do not only exhibit a relatively low heat dissipation but also a relatively high saturation magnetization $B_s$. Due to a Fe deficiency, the electrical resistance of the deflection ring is rather high. The highest magnetizations are obtained if the MgZn-ferrite material is composed so that $0.15<z<0.25$ and $0.01<y<0.2$.

Another suitable deflection ring in accordance with the invention is characterized in that maximally 20 at. % of iron is replaced by trivalent manganese. Preferably, all the iron present in the ferrite material is trivalent. The presence of a small quantity of divalent iron leads to a considerable reduction of the resistivity. This constitutes a major drawback. The presence of this small quantity of manganese ensures that all the iron present in the ferrite material is trivalent. If a small quantity of the trivalent ions in the material were reduced to divalent ions, first the more easily reducible trivalent manganese would be converted to divalent manganese. The reduction of manganese in the MgZn-ferrite material less seriously affects the properties of the inventive deflection ring than the reduction of iron. It is also advantageous to replace a part of the magnesium by lithium and/or nickel. This replacement enhances the saturation magnetisation of the deflection ring.

The MgZn-ferrite material in accordance with the invention may further be doped with small quantities of other elements, in particular sintering agents such as $B_2O_3$.

The invention further relates to a moulding of a sintered MgZn-ferrite material. This is characterized in that the majority of the grains of the sintered material have a monodomain structure. Such a moulding has a low heat dissipation when the conditions under which it is used are such that the moulding is exposed to induction levels of 20 to 25 mT and frequencies of 16 kHz, or multiples thereof, at room temperature.

The average grain size of the material is preferably 2.8 micrometers or less. The lowest dissipation is obtained if the average grain size of the material ranges between 1.45 and 2.1 micrometers. If the composition of the sintered material corresponds to the formula $Mg_{1-z}Zn_zFe_{2-y}O_4$, wherein $0.1<z<0.4$ and $0.01<y<0.3$, the moulding exhibits a low heat dissipation as well as a relatively high saturation magnetization $B_s$. By replacing maximally 20 at. % of iron by manganese, the reduction of the resistivity of the material due to a reduction of trivalent iron is avoided.

By virtue of the favourable, low heat dissipation of the inventive moulding, it is very interesting to apply the moulding in transformers and inductors. It has been found that such transformers and inductors can particularly advantageously be used at relatively high frequencies of 1 MHz or more, and, preferably, at relatively high induction levels of 1 mT or more. The material can also very advantageously be used as an antenna rod in an induction lamp.

The invention further relates to a cathode ray tube having a deflection unit which comprises a deflection ring. In accordance with the invention, a deflection ring of sintered MgZn-ferrite material as described hereinabove, is used in the cathode ray tube. By virtue thereof, excessive heating of the cathode ray tube in operation is precluded, so that the resultant reduction of the life of the surrounding electronic components and the problems caused thereby are precluded.

BRIEF DESCRIPTION OF THE DRAWINGS

These and other aspects of the invention will be apparent from and elucidated with reference to the embodiments shown and described hereinafter.

In the drawings.

DESCRIPTION OF THE INVENTION

Figure 1A:
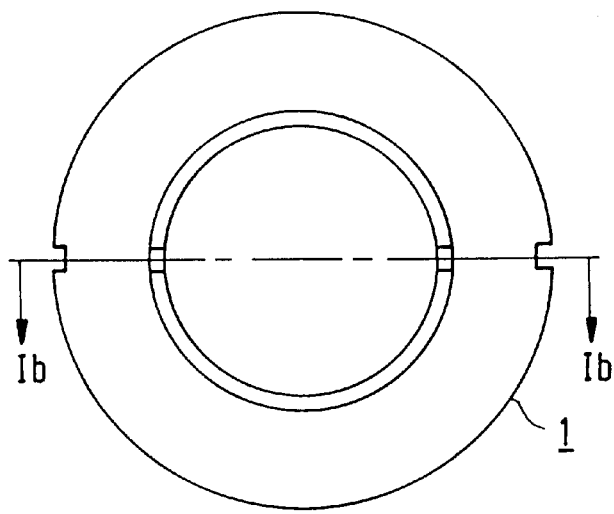
FIG. 1 shows a deflection ring in accordance with the invention.
Figure 1B:
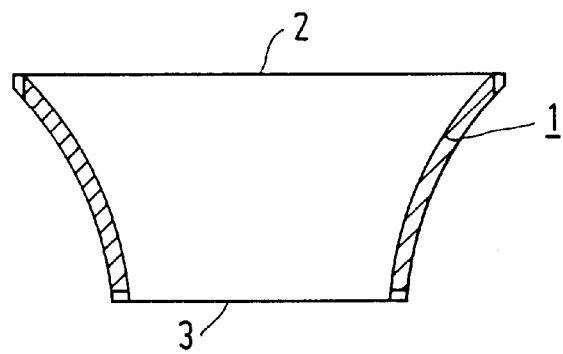

FIG. 1-$a$ is an elevational view of a deflection ring (1) in accordance with the invention. FIG. 1-$b$ is a cross-sectional view of the deflection ring of FIG. 1-$a$, taken on the line I-b. The largest outside diameter of the ring (on the side of the flared portion (2)) was 86 mm and the smallest diameter (on the side of the neck (3)) was 54 mm. The thickness of the deflection ring was 6 mm. The ring was made from a sintered MgZn-ferrite material, the average grain size of the material being 1.9 micrometers. The composition of the material corresponded to the formula $Mg_{0.8}Zn_{0.2}Mn_{0.1}Fe_{1.85}O_{3.925}$.

A number of deflection rings having the above-mentioned composition and different average grain sizes were manufactured as follows. For the starting materials use was made of magnesium oxide (MgO), zinc oxide (ZnO), manganese oxide ($Mn_2O_3$) and iron oxide ($Fe_2O_3$). To obtain the above-mentioned composition, 16.1 wt. % magnesium oxide, 8.4 wt. % zinc oxide, 4.2 wt. % manganese oxide ($Mn_2O_3$) and 71.3 wt. % iron oxide, were weighed and mixed in demineralised water for 6 hours. After filtration of the mixed powder, it was dried. Subsequently, the powder formed was prefired at 850° C. for 4 hours.

To obtain sintered deflection rings having different grain sizes, the fired product thus produced was subdivided into ten fractions, each of which was ground in a different manner in a liquid. All fractions 1–10 (see Table 1) were first ground with steel balls having a diameter of 13–16 mm for 12 hours. Fractions 1, 2, 3, 6, 7 and 10 were subsequently subjected to a further grinding operation with steel balls having a diameter of 3 mm for 3 hours. Fractions 4 and 8 were ground using these balls for 6 hours. Fractions 5 and 9 were ground using these balls for 9 hour. After filtering-off and drying, the average grain size of each of the fractions was determined by means of a Fisher measurement.

After mixing such fractions with a binder (2% ammonium algimate in demineralised water) the mixture obtained was passed through a sieve and subsequently granulated. Next, each of the granulated fractions was pressed (600 kg/cm²) to form deflection rings. These rings were sintered for approximately 2 hours at a maximum temperature ranging between 1120 and 1400° C. The specific sinter temperature T of each of the fractions is mentioned in Table 1. Dependent upon the sinter duration, sinter temperature and the fineness of the grind, the deflection rings of sintered MgZn-ferrite material had an average grain size ranging between 1.0 and 7.0 micrometers. The combination of shorter sinter times, lower sinter temperatures and longer grinding times results in sintered mouldings having a relatively small grain size. The average grain size was determined by means of the "mean linear intercept" method on the basis of scanning electron microscopy (SEM) and microstructure photographs. The average size of the magnetic domains was determined by means of neutron-polarization measurements.

The sintered rings were subjected to a number of magnetic measurements such as the heat dissipation at room temperature, an induction level of 20 mT and a frequency of 32 kHz ($P_v$-1), 64 kHz ($P_v$-2) and 128 kHz ($P_v$-3). The power losses of the rings were measured and indicated in Table 1 as $P_v$-4 (3 MHz and 10 mT) and $P_v$-5 (5 MHz and 7.5 mT). The measured dissipation values $P_v$ (mW/cm³) are listed in Table 1. The loss factor V (tan $\delta/\mu$) is also indicated in Table 1 (5 MHt). The Table shows that the rings having an average grain size of 2.8 micrometers or less exhibit a lower heat dissipation than rings having a larger average grain size. Rings having an average grain size d (micrometers) in the range from 1.45 to 2.1 micrometers were found to have the lowest heat dissipation.

TABLE 1

| no. | d | T | $P_v$-1 | $P_v$-2 | $P_v$-3 | $P_v$-4 | $P_v$-5 | V($10^{-6}$) |
|---|---|---|---|---|---|---|---|---|
| 1 | 1.1 | 1150 | 13.0 | 22.0 | 44.0 | 858 | 938 | 115 |
| 2 | 1.45 | 1200 | 12.0 | 24.3 | 41.0 | 1065 | 1071 | 134 |
| 3 | 1.75 | 1250 | 12.5 | 22.3 | 39.0 | 946 | 1009 | 140 |
| 4 | 1.90 | 1250 | 11.0 | 21.5 | 40.1 | 958 | 1057 | 136 |
| 5 | 2.11 | 1250 | 12.0 | 22 | 44.2 | 973 | 1065 | 143 |
| 6 | 2.27 | 1275 | 14.0 | 24.0 | 45.3 | 964 | 1053 | 145 |
| 7 | 2.81 | 1300 | 16.0 | 27.0 | 57.0 | 1122 | 1094 | 222 |
| 8 | 3.14 | 1300 | 19.0 | 35.0 | 70.1 | 1246 | 1391 | 323 |
| 9 | 3.53 | 1300 | 19.5 | 36.0 | 67.0 | 1464 | 1554 | 359 |
| 10 | 6.95 | 1350 | 18.0 | 37.8 | 68.4 | 1472 | 1551 | 330 |

Rings of the different composition $Mg_{0.63}Zn_{0.37}Mn_{0.10}Fe_{1.80}O_{3.85}$ were also prepared by means of the above-mentioned method. The average grain size d, the maximum sintering temperature T (° C.) and the power-losses P (mW/cm³) measured at f=3 MHz and β=10 mT, are indicated in Table 2. Also in this case, it holds that the rings having an average grain size less than 28 show the lowest losses.

TABLE 2

| d | T | P |
|---|---|---|
| 1.05 | 1200 | 843 |
| 1.35 | 1250 | 1033 |
| 1.39 | 1250 | 898 |
| 2.65 | 1250 | 912 |
| 2.31 | 1275 | 924 |
| 2.82 | 1275 | 1036 |
| 3.34 | 1300 | 1385 |
| 3.82 | 1300 | 1437 |
| 5.52 | 1350 | 1453 |

Figure 2:
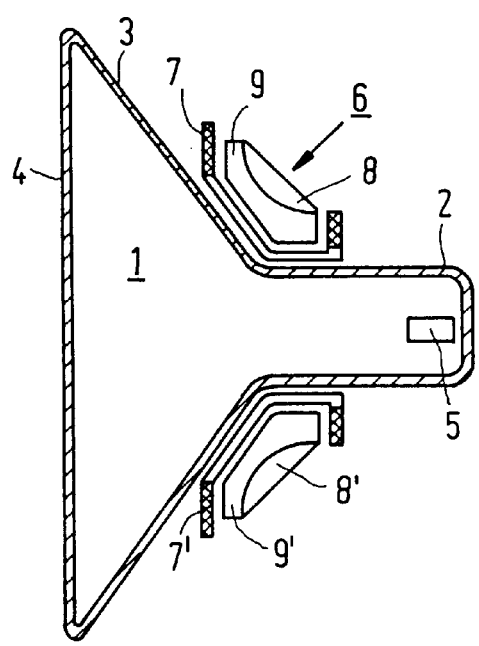
FIG. 2 is a schematic, sectional view of a cathode ray tube having a deflection unit comprising a deflection ring in accordance with the invention.

FIG. 2 is a schematic longitudinal sectional view of a cathode ray tube (1). This cathode ray tube comprises a cylindrical neck portion (2) and an adjoining funnel-shaped portion 3 whose front side (on the left in FIG. 2) is sealed by a display screen portion (4). The neck portion (3) accommodates an electrode system (5), shown schematically, by means of which one electron beam (in the case of a monochrome display tube) or three coplanar electron beams (in the case of a colour display tube) can be generated. A deflection unit (6) which surrounds the tube (1) coaxially is provided on the cathode ray tube (1) at the area where the neck portion merges with the funnel-shaped portion (3) of the tube. In this case, this unit comprises a first pair of saddle-shaped deflection coils (7, 7') for deflecting electron beam(s) in the horizontal direction, a second pair of toroidal deflection coils (8, 8') for deflecting the electron beam(s) in the vertical direction and a deflection ring (9) which supports said pair of coils (8, 8'). As is shown in this Figure, the shape of the deflection ring (9) and of the deflection coils is adapted to the funnel shape of the cathode ray tube (1).

The deflection ring (9) of the cathode ray tube (1) is manufactured from a soft-magnetic MgZn-ferrite material, the majority of the grains of the sintered material having a monodomain structure. By virtue thereof, the tube in accordance with the invention is heated to a lesser degree than a tube which comprises the deflection ring in accordance with the state of the art.

We claim:

1. A moulding of sintered MgZn-ferrite material, characterized in that the majority of the grains of the sintered material have a monodomain structure.

2. A moulding as claimed in claim 1, characterized in that the average grain size of the material is 2.8 micrometers or less.

3. A moulding as claimed in claim 2, characterized in that the average grain size of the material ranges between 1.45 and 2.1 micrometers.

4. A moulding as claimed in claim 3, characterized in that the composition of the sintered material corresponds to the formula $Mg_{1-z}Zn_zFe_{2-y}O_4$, wherein $0.1<z<0.4$ and $0.01<y<0.3$.

5. A moulding as claimed in claim 4, characterized in that maximally 15 at. % of iron is replaced by manganese.

6. A moulding as claimed in claim 2, characterized in that the composition of the sintered material corresponds to the formula $Mg_{1-z}Zn_zFe_{2-y}O_4$, wherein $0.1<z<0.4$ and $0.01<y<0.3$.

7. A moulding as claimed in claim 6, characterized in that maximally 15 at. % of iron is replaced by manganese.

8. A moulding as claimed in claim 1, characterized in that the composition of the sintered material corresponds to the formula $Mg_{1-z}Zn_zFe_{2-y}O_4$, wherein $0.1<z<0.4$ and $0.01<y<0.3$.

9. A moulding as claimed in claim 8, characterized in that maximally 15 at. % of iron is replaced by manganese.

* * * * *